United States Patent Office 3,621,757
Patented Nov. 23, 1971

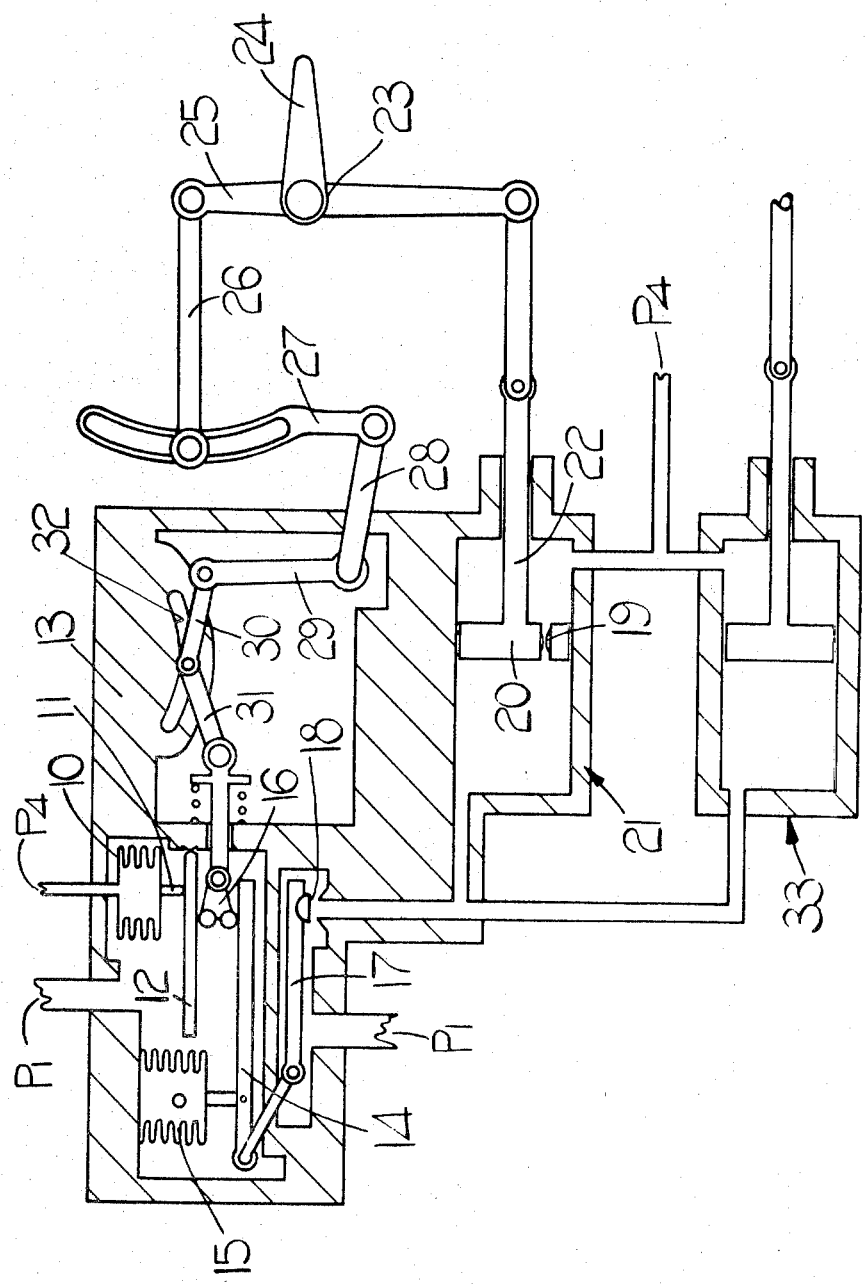

3,621,757
SERVO MECHANISM RESPONSIVE TO THE RATIO OF TWO FLUID PRESSURE SIGNALS
Harry Simister Bottoms, Solihull, England, assignor to Joseph Lucas (Industries) Limited, Birmingham, England
Filed Nov. 14, 1969, Ser. No. 876,960
Claims priority, application Great Britain, Nov. 14, 1968, 54,068/68
Int. Cl. F15b *15/17, 9/10, 13/16*
U.S. Cl. 91—49                                  10 Claims

ABSTRACT OF THE DISCLOSURE

The invention relates to a servo-mechanism for producing an output movement proportional to a ratio of two fluid pressure signals. The output movement is provided by the displacement of a piston in a double acting piston and cylinder unit and having an orifice controlled bypass. Pressure drop across the bypass is controlled by a lever movable in response to one of the signals and also in response to the force exerted by a second lever via an interconnecting member. The second lever is movable in response to the difference between the two signal pressures. The position of the interconnecting member is controlled by the piston via a feedback mechanism. An interconnection of the feedback mechanism is constrained to move along a cam surface, whereby the displacement of the piston can be made a desired function of the ratio of the two fluid pressure signals.

---

This invention relates to a servo-mechanism for producing an output movement proportional to a ratio of two fluid pressure signals.

A servo-mechanism according to the invention comprises a first fluid actuating device having an output member movable in one direction by one fluid pressure signal and in the opposite direction by the other fluid pressure signal, a first lever acted upon by said output member, a second lever, an interconnecting member interposed between said levers whereby a force is applied to said second lever which is proportional to the force applied to said first lever by said output member for any given position of the interconnecting member, said interconnecting member being movable to vary the ratio of said forces, a second fluid actuating device acted upon by said second signal pressure applying to said second lever a force tending to turn said second lever in the direction opposite to that in which it is turned by said interconnecting member, a valve member operable by said second lever, a piston and cylinder unit having an orifice controlled bypass passage whereby fluid can flow from one side of the piston to the other, said passage being in series with said valve, and a feedback mechanism coupling said piston to said interconnecting member, said feedback mechanism incorporating an arm angularly movable proportionally to the linear displacement of the piston and a pair of pivotally interconnected links coupling said arm to the interconnecting member, and a cam surface by means of which the pivotal interconnection of said links is guided, said cam surface being so shaped that the displacement of the piston is, in use, directly proportional to a function of the ratio of the magnitudes of the fluid pressure signals.

An example of the invention is shown in the accompanying diagram.

The mechanism shown incorporates a first fluid actuated device in the form of a bellows 10 having an output member 11 movable in one direction by a first signal pressure P4 applied to the interior of the bellows and movable in the opposite direction by a second signal pressure P1 applied to the external surface of the bellows. The output member 11 acts upon a lever 12 which is pivoted at one end to the housing 13 of the servo-mechanism. A second lever 14 is pivotally mounted in the housing 13 and is acted upon by a bellows 15 the interior of which is evacuated whilst the exterior of the bellows 15 is acted upon by the pressure P1. An interconnecting member 16 having a pair of rollers is interengaged between the levers 12, 14 so that a force is applied to the lever 14 which is proportional to the force applied to the lever 12 by the output member 11. The ratio of the force applied to the lever 14 to the force applied to the lever 11 is variable by movement of the member 16.

The lever 14 is connected to an arm 17 which controls a valve 18. The valve 18 is in series with an orifice 19 in a piston 20 of a piston cylinder unit 21. The pressure P4 is applied to one side of the piston 20 and causes flow through the orifice 19 and through the valve 18 to an exhaust passage at the pressure P1. The piston 20 has a piston rod 22 which effectively decreases the area of the side of the piston on which the pressure P4 acts. Flow through the orifice 19 causes a pressure drop so that a lower pressure acts on the opposite side of the piston 20 and the piston 20 will be in equilibrium when the flow through orifice 19 is just sufficient to reduce the pressure so that the pressures on opposite sides of the piston are in inverse proportion to the areas at the two sides of the piston.

The piston rod 22 is linked to a bell crank lever 23 which has an output arm 24 from which the output movement of the servomechanism is derived. The lever 23 has an additional arm 25 which is connected to a feedback mechanism whereby the output member 16 is movable. This feedback mechanism includes a link 26 adjustably coupled to an arm 27 on a spindle 28 on which there is a second arm 29. The arm 29 is connected to the output member 16 through the intermediary of a pair of pivotally interconnected links 30, 31. The housing 13 has a cam slot 32 which guides the pivotal interconnection of the links 30, 31.

It will be noticed that the angular displacement of the arm 29 is directly proportional to the linear displacement of the piston 20 and if this arm 29 were coupled directly to the interconnecting member 16 the servo-mechanism would have a hyperbolic characteristic, i.e. the displacement of the piston would be a hyperbolic function of the ratio $P_4/P_1$. The cam surface 32, is however, so designed that the displacement of the interconnecting member 16 is an inverse hyperbolic function of the annular displacement of the arm 29 so that there is a linear relationship between the piston displacement and the ratio $P_4/P_1$, when the system is in equilibrium. The cam surface 32 may be shaped to give displacement of the piston as any other required function of the ratio $P_4/P_1$.

One or more additional piston and cylinder units 33 may be connected in parallel with the unit 21, the displacement of the, or each, said additional unit also being the required function of the ratio $P_4/P_1$.

Having thus described my invention what I claim as new and desire to secure by Letters Patent is:

1. A servo-mechanism for producing an output movement proportional to the ratio of two fluid pressure signals comprises a first fluid actuating device having an output member movable in one direction by one fluid pressure signal and in the opposite direction by the other fluid pressure signal, a first lever acted upon by said output member, a second lever, an interconnecting member interposed between said levers whereby a force is applied to said second lever which is proportional to the force applied to said first lever by said output member for any given position of the interconnecting member, said interconnecting member being movable to vary the ratio of said forces, a second fluid actuating device acted upon by said second signal pressure applying to said second lever a force tending to turn said second lever in the direction opposite to that in which it is turned by said interconnecting member, a valve member operable by said second lever, a piston and cylinder unit having an orifice controlled bypass passage whereby fluid can flow from one side of the piston to the other, said passage being in series with said valve, and a feedback mechanism coupling said piston to said interconnecting member, said feedback mechanism incorporating an arm angularly movable proportionally to the linear displacement of the piston and a pair of pivotally interconnected links coupling said arm to the interconnecting member, and a cam surface by means of which the pivotal interconnection of said links is guided, said cam surface being so shaped that the displacement of the piston is, in use, directly proportional to a function of the ratio of the magnitudes of the fluid pressure signals.

2. A servo mechanism as claimed in claim 1 in which the first fluid actuating device is in the form of a bellows.

3. A servo mechanism as claimed in claim 2 in which the first and second fluid pressure signals are respectively applied internally and externally of the said bellows.

4. A servo mechanism as claimed in claim 1 in which the second fluid actuating device is in the form of a bellows.

5. A servo mechanism as claimed in claim 4 in which the bellows forming the second fluid actuating device is evacuated and is subjected externally to the said second fluid pressure signal.

6. A servo mechanism as claimed in claim 1 in which the said bypass passage is formed in the said piston.

7. A servo mechanism as claimed in claim 1 in which a side of the said piston remote from the said valve is subjected to the said one fluid pressure signal.

8. A servo mechanism as claimed in claim 1 which includes means for varying the movement of the said arm for a given piston displacement.

9. A servo mechanism as claimed in claim 1 in which the said function is a linear function.

10. A servo mechanism as claimed in claim 1 which includes additional piston and cylinder units connected in parallel with the first mentioned piston and cylinder unit.

References Cited

UNITED STATES PATENTS

| | | | |
|---|---|---|---|
| 3,045,983 | 7/1962 | Best | 91—382 |
| 3,139,922 | 7/1964 | Peczkowski | 91—49 |
| 3,232,179 | 2/1966 | McCombs, Jr. | 91—385 |
| 3,393,606 | 7/1968 | Magnani et al. | 91—382 |

PAUL E. MASLOUSKY, Primary Examiner

U.S. Cl. X.R.

91—382, 386, 411 R, 416, 417